CARTON

Original Filed June 14, 1967 2 Sheets-Sheet 1

INVENTOR.
JOSEPH J. ESTY
BY Warren H. F. Schmiedeir,
ATTORNEY

CARTON

Original Filed June 14, 1967 2 Sheets-Sheet 2

INVENTOR
JOSEPH J. ESTY
BY
Warren H. F. Schmidt
ATTORNEY

United States Patent Office

Re. 27,872
Reissued Jan. 8, 1974

27,872
CARTON

Joseph J. Esty, San Diego, Calif., assignor of a fractional part interest to Oberlin J. Evenson, San Diego, Calif.

Original No. 3,521,806, dated July 28, 1970, Ser. No. 645,968, June 14, 1967. Application for reissue Mar. 22, 1971, Ser. No. 126,652
Int. Cl. B65d *5/60, 81/20*
U.S. Cl. 229—14 B 5 Claims

Matter enclosed in heavy brackets [ ] appears in the original patent but forms no part of this reissue specification; matter printed in italics indicates the additions made by reissue.

ABSTRACT OF THE DISCLOSURE

A package for preserving perishable products, such as food and flowers, in which the product is in an impermeable container which has been purged, after the product is in the container, by forcing an inert gas through the container. The composite package includes the container enclosed in an inherently stable carton.

SUMMARY OF THE INVENTION

One embodiment comprises the steps of inserting a flexible container or envelope of the type that includes sealable tubing into an inherently stable carton, and placing the product to be packaged in the container. The container is sealed and then evacuated of air through the tubing. The container is then pressurized with inert gas by forcing the gas through the tubing. The pressurized container is then sealed by sealing the tubing.

In carrying out the method, I prefer to use two flexible, sealable tubes. The envelope is purged by forcing an inert gas through one of the tubes and dispelling the air through the other tube. After the purge is completed, the tubes are sealed.

One embodiment of the package comprises an inherently stable carton which supports tubing extending through the walls thereof. A flexible sealable container, having hermetically connected tubing, is disposed in the carton, the tubing being supported by the carton.

In a second embodiment, the carton walls terminate in a container receiving opening and a cover is adapted to be slid into covering relationship with the opening. The cover has walls, extending in one direction, that are adapted to surround the container walls. The cover walls include a slot extending from the edge and parallelly of the one direction, the slot being in alignment with the extending sealable tubing.

Other features and the advantages of the present invention will be apparent from the following description, reference being had to the accompanying drawings wherein preferred embodiments of the invention are illustrated.

DESCRIPTION OF THE PREFERRED EMBODIMENT

Figure 1:
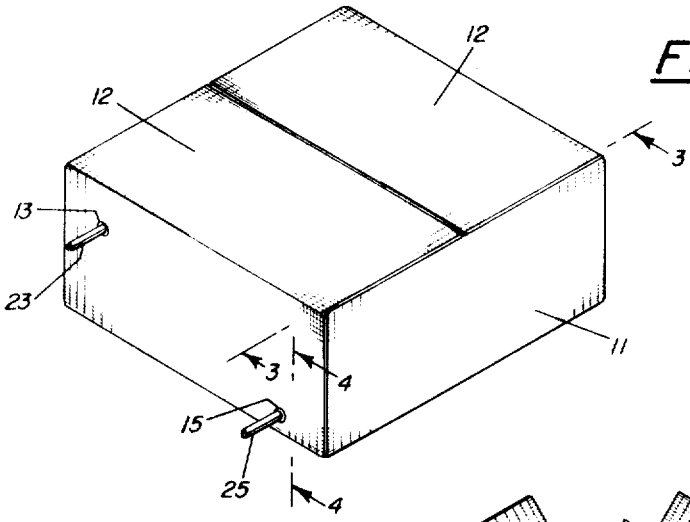
FIG. 1 is a perspective view of one embodiment of the package of this invention.

Referring more in detail to the drawings, and particularly to FIG. 1, the package includes an inherently stable carton 11. The carton 11 is preferably of the conventional cardboard crating type and includes closing flaps 12 extending upwardly from the sides thereof. The carton 11 includes an inlet opening 13 juxtaposed one side and the top and an outlet opening 15 juxtaposed the opposite side and the bottom.

A flexible, plastic, i.e., impermeable, container 17 is disposed in the carton 11. The container 17 includes flaps 18 forming an opening 19 for accepting perishable products such as fruits, vegetables, meats and flowers, apples 21, being illustrative. Plastic tubes 23 and 25 extend from the container. The tubes 23 and 25 are alignable with and extend through the inlet and outlet openings, 13 and 15, respectively, and are supported by the walls forming the openings of the container.

Figure 5:
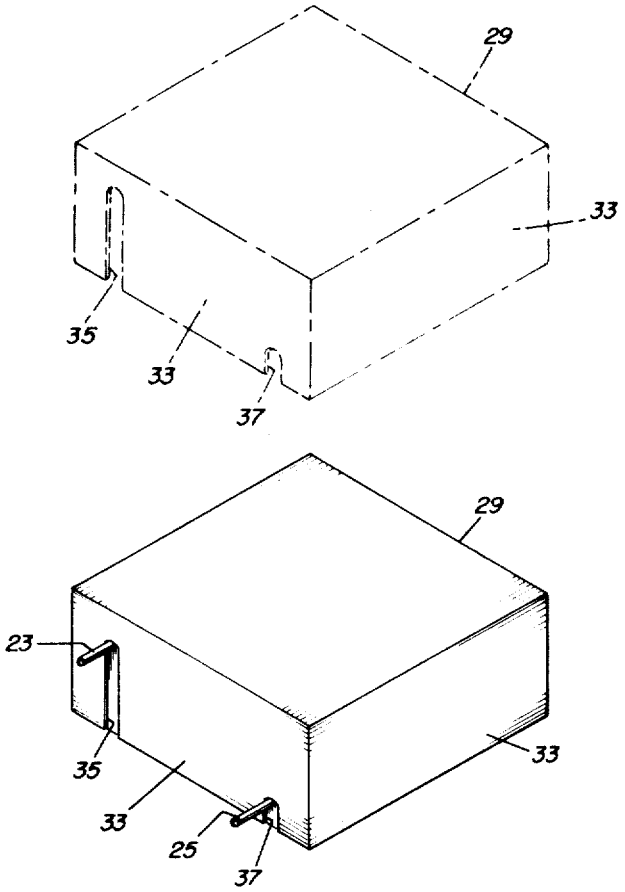
FIG. 5 is a perspective view of another embodiment of the package.

Referring now to the embodiment shown in FIG. 5, the carton 11 is of the same general configuration as that shown in FIG. 1, except there are no flaps 12. Rather, a cover 29 is provided for covering the container 17 receiving opening formed by the walls of the carton 11. The cover 29 is shown in broken lines, removed from the carton 11. The cover 29 includes walls 33 that surround the walls of the carton 11 and is adapted to be slidably extended thereover. One wall of the cover 29 includes slots 35 and 37 for accepting the tubes 23 and 25, respectively. Thus, the cover 29 can be slipped over the carton 11 and secured into covering position with the tubes 23 and 25 extending therethrough and accessible to be connected and sealed.

Figure 2:
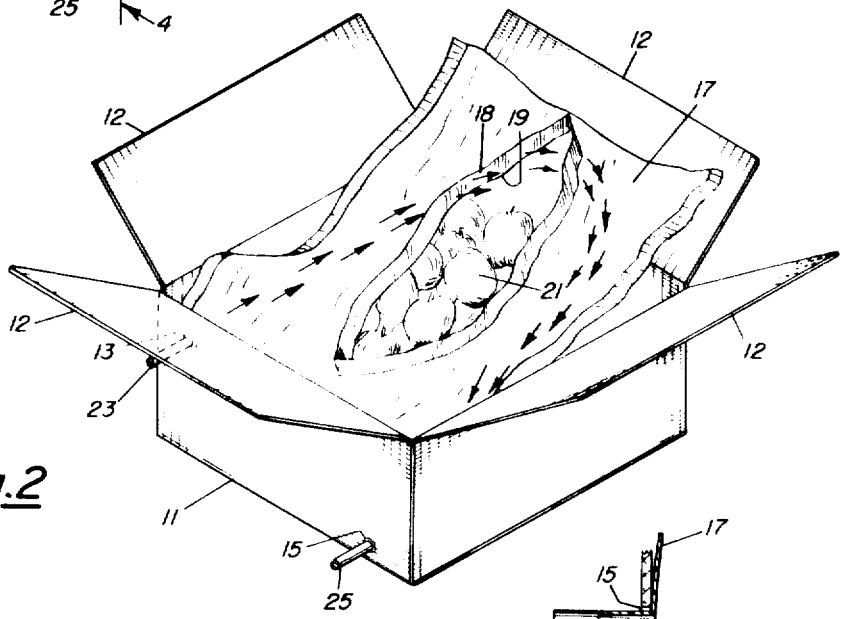
FIG. 2 is a perspective view of the package shown in FIG. 1, the stable carton being shown with the top open.
Figure 4:
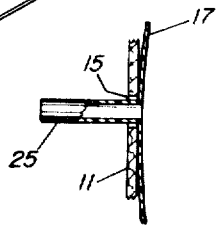
FIG. 4 is a fragmentary, sectional view of the package shown in FIG. 1, the view being taken along the line 4—4 of FIG. 1.
Figure 3:
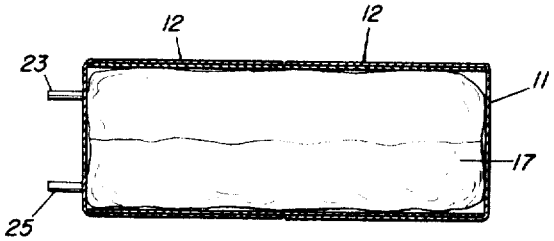
FIG. 3 is a sectional view of the package shown in FIG. 1, the view being taken along the line 3—3 of FIG. 1.

Shipping cartons 11 of the type depicted in FIG. 1, are generally supplied to the packager in a collapsed form. Thus, when it is desirable to package the produce 21 for shipping or storage, the carton 11 is erected as shown in FIG. 2. The container 17 is then placed in the carton through the top opening and the tubes 23 and 25 are extended through the inlet and outlet openings 13 and 15, respectively. The produce herein shown at 21, is then inserted through the opening 19 in the container and the opening is sealed. In the embodiment shown in FIG. 1, the envelope 17 is plastic and the opening 19 is sealed by pressing the flaps 18, forming the opening 19, together with conventional heat sealing mechanism. The flaps 12 are then closed and taped in a conventional manner.

Any suitable method can be employed for removing the air from the container and substituting an inert gas. I prefer to connect a hose (not shown) to a supply of inert gas, such as argon or nitrogen, and to the tube 23. The inert gas is then released into the container 17 through the tube 23 and the inert gas and air mixture is exhausted through the outlet tube 25.

It is noted that the inlet tube 23-outlet tube 25 arrangement depicted, effects a very effective flow pattern. This flow pattern is depicted in FIG. 2 by arrows. The incoming gas enters the container 17 from the front and is propelled generally along and parallel to the side nearest the inlet tube 23. When the gas reaches the back wall of the container 17, it is deflected inwardly from the side and passes generally along the back wall until it reaches the side nearest the outlet tube 25. The gas is again deflected and is directed back toward the front of the container 17 and will be forced downwardly to pass out the outlet tube 25. Thus, flow is assured throughout the container 17 and no air pockets will be left uncirculated when the purge is completed.

The inert gas purge is continued for a time sufficient to drive essentially all of the air out of the container 17. When the desired level of inert atmosphere is reached, approximately 99.8%, the purge is discontinued and while the container 17 is still pressurized, the tubes 23 and 25 are sealed. Sealing is preferably effected by cutting of the plastic tubes 23 and 25 with hot scissors, thereby severing and sealing the tube simultaneously. Since both tubes 23 and 25 extend from the same side of the container 11, they are readily accessible to the work during the packaging.

The remaining portions of the tubes 23 and 25 are then preferably tucked back into the carton 11. If desirable, the openings 13 and 15 may then be covered in any conventional manner. The packaged produce 21 is then ready for shipment and is maintained in an inert atmosphere. Spoilage and decaying of the produce is obviated since essentially all the oxygen has been purged from the container 17 and photosynthesis is suspended. Pressurization of the container 17 is preferred since if the oxygen were expelled and a vacuum left in the container, there would be greater danger of oxygen seepage into the container. The lack of oxygen will cause any animal life included in the container 17 to quickly suffocate and the produce 21 will be portected from insect damage.

The above described method is preferred since it is generally much more economical to force a purge through the container 17 to purge the air therefrom, rather than to evacuate the air by vacuum. However, if it were desirable to evacuate the air by pulling a vacuum, only one tube, as for instance 23, would be necessary. The air could be evacuated from the container 17 through the tube 23 and the container 17 could then be pressurized by pumping the inert gas in through the tube 23. The tube 23 would then be sealed in the manner described above.

Referring now to packaging the produce 21, in the package embodiment shown in FIG. 5, the same general procedure, as that first described, is followed, except that, rather than closing the flaps 12, the cover 29 is slid into position and secured, as by taping. The container 17 is then purged and the tubes 23 and 25 sealed as described above.

From the foregoing, it will be apparent that the packages herein described, provide simple, effective and economical means of packaging perishable produce, meats and flowers.

I claim:

1. An inherently stable package for shipping and preserving perishable products such as food and flowers, said package comprising:

(A) an inherently stable carton having:

(1) two openings for tubes;

(B) a flexible and sealable container having:

(1) a sealable product opening, (2) a permanently sealable inlet tube, for purging gas, hermetically connected with the container, said tube being aligned with and extendable through one of the said openings in the carton for connecting the same with a source of purging gas, (3) a permanently sealable outlet tube hermetically connected with the container, said latter tube being aligned with and extendable through the other of said openings in the carton.

2. A combination as defined in claim 1, characterized in that both openings are in the same side of the carton.

3. A combination as defined in claim 1, characterized in that the openings are positioned so that the incoming gas is directed by the inlet tube from one side of the carton and toward the opposite side and then directed toward the outlet tube spaced from the incoming gas.

*4. An inherently stable package for shipping and preserving products such as food and flowers, said package comprising:*

*(A) walls forming an inherently stable carton;*

*(B) a flexible and sealable container having:*

*(1) a sealable product opening,*

*(2) a permanently sealable inlet tube for purging gas, hermetically connected with the container and extending through a wall of said carton for connecting the same with a source of purging gas,*

*(3) a permanently sealable outlet tube hermetically connected with the container, said latter tube extending through a wall of said carton;*

*said tubes being positioned with respect to the container so that the incoming gas is directed by the inlet tube to one side of the container, and rearwardly, then along the rear of the container, and then along the opposite side of the container and toward the outlet tube.*

*5. A combination as defined in claim 4, characterized in that both tubes extend through the same wall of the carton.*

References Cited

The following references, cited by the Examiner, are of record in the patented file of this patent or the original patent.

UNITED STATES PATENTS

| | | | |
|---|---|---|---|
| 3,352,472 | 11/1967 | Cummings | 229—14 B |
| 3,214,221 | 10/1965 | Finnegan. | |
| 3,112,047 | 11/1963 | Weinreich et al. | |
| 3,165,114 | 1/1965 | Garret | 229—62.5 |
| 3,373,918 | 3/1968 | Krings | 229—62.5 |

FOREIGN PATENTS

| | | | |
|---|---|---|---|
| 229,822 | 7/1960 | Australia | 229—14 B |

DONALD F. NORTON, Primary Examiner

U.S. Cl. X.R.

206—46 PV; 229—53; 53—22 B